(12) United States Patent
Mullis, II et al.

(10) Patent No.: US 7,734,698 B2
(45) Date of Patent: Jun. 8, 2010

(54) METHODS, SYSTEMS AND COMPUTER PROGRAM PRODUCTS FOR NON-INTRUSIVE SUBSEQUENT PROVISIONING OF A MOBILE TERMINAL

(75) Inventors: Samuel L. Mullis, II, Apex, NC (US); Scott G. Hicks, Apex, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 2214 days.

(21) Appl. No.: 10/304,348

(22) Filed: Nov. 26, 2002

(65) Prior Publication Data

US 2004/0103171 A1 May 27, 2004

(51) Int. Cl.
*G06F 15/16* (2006.01)
(52) U.S. Cl. .................... 709/206; 709/221; 709/227
(58) Field of Classification Search .............. 455/412.1, 455/412.2, 433, 432, 552, 558
See application file for complete search history.

(56) References Cited

U.S. PATENT DOCUMENTS

| | | | | |
|---|---|---|---|---|
| 6,065,120 | A * | 5/2000 | Laursen et al. ............... | 726/5 |
| 6,640,097 | B2 * | 10/2003 | Corrigan et al. .......... | 455/414.1 |
| 2001/0053694 | A1 | 12/2001 | Igarashi et al. | |
| 2002/0024536 | A1 * | 2/2002 | Kahan et al. ................ | 345/745 |
| 2002/0142763 | A1 * | 10/2002 | Kolsky ........................ | 455/419 |
| 2002/0168054 | A1 * | 11/2002 | Klos et al. ................. | 379/1.04 |
| 2003/0027581 | A1 * | 2/2003 | Jokinen et al. .............. | 455/456 |
| 2004/0010591 | A1 * | 1/2004 | Sinn et al. ................... | 709/225 |
| 2004/0103171 | A1 * | 5/2004 | Mullis et al. ................ | 709/221 |

FOREIGN PATENT DOCUMENTS

WO    WO 98/41044    9/1998
WO    WO 01/80477 A1    10/2001

OTHER PUBLICATIONS

C. Perkins, "IP Mobility Support" IBM RFC 2002, pp. 1-74, http://www.ietf.org/rfc/rfc2002.txt.
"TIA/IS-835-B," *TIA Interim Standard*. Telecommunications Industry Association, Sep. 2002, pp. 1-98.
"Specification Information Note WAP-167_103-ServiceInd-20010926-a, Version Sep. 26, 2001," Wireless Application Protocol Forum, Ltd. (2001) pp. 1-8.
"Specification Information Note WAP-249_102-PPGService-20011009-a, Version Sep. 9, 2001," Wireless Application Protocol Forum, Ltd. (2001) pp. 1-6.

(Continued)

*Primary Examiner*—John Follansbee
*Assistant Examiner*—Dhairya A Patel
(74) *Attorney, Agent, or Firm*—Myers Bigel Sibly & Sajovec P.A.

(57) ABSTRACT

Embodiments of the present invention include methods, terminals and circuits for updating provisioning data of a mobile terminal. A network initiated subsequent provisioning message requesting that the mobile terminal initiate a session to update the provisioning data of the mobile terminal is received and it is determined if the mobile terminal is executing a foreground data application utilizing a current registered Internet Protocol (IP) session. An IP session is selectively initiated to update the provisioning data of the mobile terminal based on the determination of whether the mobile terminal is executing a foreground data application utilizing a current registered IP session.

30 Claims, 10 Drawing Sheets

OTHER PUBLICATIONS

"Specification Information Note WAP-183_003-PROVCONT-20010912-a, Version Sep. 12, 2001," Wireless Application Protocol Forum, Ltd. (2001) pp. 1-5.

"Service Loading, Version Jul. 31, 2001," Wireless Application Protocol Forum, Ltd. (2001) pp. 1-18.

"Specification Information Note WAP-168_103-ServiceLoad-20010816-a, Version Aug. 16, 2001," Wireless Application Protocol Forum, Ltd. (2001) pp. 1-5.

"Specification Information Note WAP-247_100-PAP-20011010-a, Version Oct. 10, 2001," Wireless Application Protocol Forum. Ltd. (2001) pp. 1-5.

"Service Indication, Version Jul. 31, 2001," Wireless Application Protocol Forum, Ltd. (2001) pp. 1-28.

"Specification Information Note WAP-235_100-PushOTA-20011008-a, Version Oct. 8, 2001," Wireless Application Protocol Forum, Ltd. (2001) pp. 1-6.

"Specification Information Note WAP-235_101-PushOTA-20020612-a, Version Jun. 12, 2002," Wireless Application Protocol Forum. Ltd. (2002) pp. 1-10.

"WAP Push Architectural Overview, Version Jul. 3, 2001," Wireless Application Protocol Forum, Ltd. (2001) pp. 1-24.

"WAP Provisioning Smart Card, WAP-I86-PROVSC-20010710-a, Version Jul. 10, 2001," Wireless Application Protocol Forum, Ltd. (2001) pp. 1-37.

"Push Message, Version Mar. 22, 2001," Wireless Application Protocol Forum, Ltd. (2001) pp. 1-14.

"Provisioning Content, Version Jul. 24, 2001," Wireless Application Protocol Forum, Ltd. (2001) pp. 1-59.

"Provisioning User Agent Behaviour, Version Mar. 14, 2001," Wireless Application Protocol Forum, Ltd. (2001) pp. 1-21.

"Specification Information Note WAP-183_005-ProvCont-20020411-a, Version Apr. 11, 2002," Wireless Application Protocol Forum, Ltd. (2002) pp. 1-6.

"Specification Information Note WAP-183_004-ProvCont-20011025-a, Version Oct. 25, 2001," Wireless Application Protocol Forum, Ltd. (2001) pp. 1-5.

"Specification Information Note WAP-184_001-PROVBOOT-20011010-a, Version Oct. 10, 2001," Wireless Application Protocol Forum, Ltd. (2001) pp. 1-6.

"Specification Information Note WAP-175_102-CacheOp-20010816-a, Version Aug. 16, 2001," Wireless Application Protocol Forum, Ltd. (2001) pp. 1-5.

"Provisioning Architecture Overview, Version Mar. 14, 2001," Wireless Application Protocol Forum, Ltd. (2001) pp. 1-22.

"Push OTA Protocol, Version Apr. 25, 2001," Wireless Application Protocol Forum, Ltd. (2001) pp. 1-44.

"Provisioning Bootstrap, Version Mar. 14, 2001," Wireless Application Protocol Forum, Ltd. (2001) pp. 1-24.

"Push Proxy Gateway Service, Version Jul. 13, 2001," Wireless Application Protocol Forum, Ltd. (2001) pp. 1-20.

"Push Access Protocol, Version Apr. 29, 2001," Wireless Application Protocol Forum, Ltd. (2001) pp. 1-49.

International Search Report, PCT/US03/34421, mailed Jul. 29, 2004.

"Cache Operation Version Jul. 31, 2001," Wireless Application Protocol Forum, Ltd. (2001) pp. 1-18.

Wireless Application Protocol (WAP): Provisioning Architecture Overview WAP-182-ProvArch-20010314-a (22 pages); Version 14 (Mar. 2001).

* cited by examiner

METHODS, SYSTEMS AND COMPUTER PROGRAM PRODUCTS FOR NON-INTRUSIVE SUBSEQUENT PROVISIONING OF A MOBILE TERMINAL

BACKGROUND OF THE INVENTION

The present invention relates to the field of communications in general and more particularly, to the provisioning of a mobile terminal device.

Increasingly, mobile terminal devices, such as radiotelephones, personal digital assistants (PDAs) and the like, have incorporated data capabilities such as web browsing and/or e-mail receipt and generation. One technique for providing such data capabilities to mobile devices is through the use of the Internet Protocol (IP) over a wireless communications medium. Typically, the use of IP packet data communications in a wireless environment takes one of two forms, simple IP where communications to a mobile device either occur within a single subnet or the device logs on to each subnet individually when it is moved to that subnet or mobile IP (MIP) where a mobile device utilizes a home agent to communicate with the Internet and may move between multiple subnets, without logging on to each subnet, by registering with a foreign agent. Details of the MIP standard are provided in the IETF RFC-2002 on mobility support and the MIP adaptation for Code Division Multiple Access (CDMA) wireless communications are provided in the Wireless IP Network Standard, TIA/EIA IS-835.

A mobile device utilizing MIP typically registers with a foreign agent and obtains a lease for a session established between the foreign agent and the mobile device. The lease, typically, has a fixed duration, for example, a 2 hour duration. Typically, prior to the lease expiring, the mobile terminal will renew the lease. For example, a lease is generally renewed between 0 and 60 minutes before the lease expires and, typically, about 30 minutes before the lease expires. The foreign agent forwards data received from the home agent to the mobile device and may forward data received from the mobile device to the home agent. Typically, the home agent acts as an access point to the Internet such that all IP communications with the mobile device pass through the home agent. The foreign agent, typically, performs the forwarding function for the duration of the lease if the mobile device has a registered MIP session with the foreign agent.

In a conventional MIP system, a mobile device may be provided with authentication, validation, feature and/or other data in a process known as "provisioning." Typically, the process is initially performed when the mobile device is placed in service. This initial provisioning will, typically, establish a default network access information (NAI) profile and provide feature configuration for the mobile device. This initial provisioning is often referred to as network initiated initial provisioning (NIIP). Changes to the information that is provided by provisioning a mobile device, for example, to change a username or password for network access, are typically provided as part of a network initiated subsequent provisioning (NISP) operation.

Typically, a NISP trigger request is transmitted to a mobile device utilizing a short message service (SMS) message. When the mobile device receives the NISP request, the mobile device establishes a MIP session utilizing the default NAI profile and obtains the new provisioning data. This provisioning data may change the information in the default NAI profile or other NAI profiles utilized by the mobile device, such as a custom NAI profile. For example, in a typical system, a mobile device uses a custom NAI profile for user-initiated data applications, such as web browsing or executing a Java 2 Platform, Micro Edition (J2ME) MID1et. A user, however, may change their username or password by changing this information via a browser interface. This information will, typically, be updated at the network, for example, at an authentication, authorization and accounting server, and a NISP request may be sent to the mobile device so that the information stored in the mobile device may be updated. Typically, the NISP request is sent as an SMS message to the mobile device. The mobile device then establishes a session using its default NAI profile and obtains the updated provisioning information.

One difficulty that may arise in a system that utilizes multiple NAI profiles but which may only maintain one MIP session at a time occurs if a NISP request is received during a MIP session established using the custom NAI profile. To immediately process the NISP request, the mobile device would generally need to terminate the current MIP session and establish a MIP session using the default NAI profile. Such a termination may be intrusive and/or confusing to the user as it could disrupt the session of the user application without the user knowing the cause of the disruption. Furthermore, if the NISP request is discarded by the mobile device, so as to not disrupt the session of the user application, the NISP request will generally not be resent by the network without further intervention by the user. Such is the case because the NISP request is typically received as an SMS message that is acknowledged as received by the mobile device. Furthermore, after some period of time, for example, 72 hours, without receiving a response the NISP request the service provider typically discards the new requested changes. Thus, the user may need to repeat all of the changes and the provisioning update reinitiated by the service provider or a call to customer service may be required.

One proposed solution to the above described problem is to queue the NISP request. The NISP request would then be carried out if no keystroke was received for a predefined time interval, such as 1 minute, or if no data packets were sent or received for a second predefined time interval, such as 1 minute. While such an approach may reduce the intrusiveness of carrying out the NISP request, it may create implementation difficulties in the management of multiple timers in disparate logical blocks in a coordinated fashion. Furthermore, such a solution does not take into account the need for the mobile device to periodically perform a MIP re-registration. If the response to the NISP request is delayed until after a MIP re-registration is required, the re-registration will, typically, fail as the old parameters may be utilized that are out of sync with the network infrastructure.

SUMMARY OF THE INVENTION

Embodiments of the present invention include methods, terminals and circuits for updating provisioning data of a mobile terminal. A network initiated subsequent provisioning message requesting that the mobile terminal initiate a session to update the provisioning data of the mobile terminal is received and it is determined if the mobile terminal is executing a foreground data application utilizing a current registered Internet Protocol (IP) session. An IP session is selectively initiated to update the provisioning data of the mobile terminal based on the determination of whether the mobile terminal is executing a foreground data application utilizing a current registered IP session.

In further embodiments of the present invention, the mobile terminal establishes IP sessions utilizing one of a default profile and a custom profile, which may be one of many custom profiles. In such embodiments, determining if the mobile terminal is executing a foreground data application utilizing a current registered IP session includes determining if the mobile terminal has a current IP session utilizing a custom profile and determining if a foreground data application is utilizing the current IP session if the mobile terminal has a current IP session utilizing the custom profile. In such embodiments, selectively initiating an IP session to update the provisioning data of the mobile terminal may be provided by initiating an IP session utilizing the default profile to update the provisioning data of the mobile terminal if it is determined that the mobile terminal does not have a current registered IP session utilizing a custom profile.

In additional embodiments of the present invention, selectively initiating an IP session to update the provisioning data of the mobile terminal is provided by initiating an IP session utilizing the default profile to update the provisioning data of the mobile terminal if it is determined that the mobile terminal has a current registered IP session utilizing a custom profile and does not have a foreground data application initiating the current registered IP session. Initiation of an IP session may be provided by terminating the current registered IP session and initiating an IP session utilizing the default profile.

In still other embodiments of the present invention, selectively initiating an IP session to update the provisioning data of the mobile terminal is provided by queuing a request to initiate an IP session to update the provisioning data of the mobile terminal if it is determined that the mobile terminal is executing a foreground data application utilizing the current registered IP session. Such embodiments may also determine if an update to the provisioning data of the mobile terminal has completed successfully and de-queue a request corresponding to the update to the provisioning data if the update to the provisioning data completes successfully. A determination of whether an update to the provisioning data of the mobile terminal has failed and whether the failure of the update to the provisioning data is a recoverable failure may also be made. A request corresponding to the update to the provisioning data is de-queued if it is not a recoverable failure and the update to the provisioning data retried if the failure is a recoverable failure.

In additional embodiments of the present invention, if the mobile terminal has terminated the current registered IP session, it is determined if a request to initiate an IP session to update the provisioning data of the mobile terminal is queued and an IP session is initiated to update the provisioning data of the mobile terminal if it is determined that a request to initiate an IP session to update the provisioning data of the mobile terminal is queued and it is determined that the mobile terminal has terminated a registered IP session. Additionally, it may be determined if all foreground data applications utilizing the registered IP session have terminated and if a request to initiate an IP session to update the provisioning data of the mobile terminal is queued. An IP session may be initiated to update the provisioning data of the mobile terminal if it is determined that a request to initiate an IP session to update the provisioning data of the mobile terminal is queued and it is determined that the mobile terminal has terminated all foreground data applications utilizing the registered IP session.

In yet further embodiments of the present invention, it is determined if the mobile terminal is initiating a re-registration of the current registered IP session and whether a request to initiate an IP session to update the provisioning data of the mobile terminal is queued. An IP session is initiated to update the provisioning data of the mobile terminal if it is determined that a request to initiate an IP session to update the provisioning data of the mobile terminal is queued and it is determined that the mobile terminal is initiating a re-registration of the current registered IP session.

In additional embodiments of the present invention, it is determined if an update to the provisioning data of the mobile terminal has completed successfully and a request corresponding to the update to the provisioning data is de-queued if the update to the provisioning data completes successfully. It is also determined if the successfully completed update to the provisioning data interrupted a registered IP session and the interrupted registered IP session is re-initiated utilizing the updated provisioning data if the successfully completed update to the provisioning data interrupted a registered IP session.

In particular embodiments of the present invention, an IP session to update the provisioning data of the mobile terminal is terminated if an incoming or outgoing voice call is initiated during the IP session to update the provisioning data.

In certain embodiments of the present invention, the current registered IP session and the initiated IP session are mobile Internet Protocol (MIP) sessions. Additionally, the network initiated subsequent provisioning message requesting that the mobile terminal initiate a session to update the provisioning data of the mobile terminal may be received as a Wireless Access Protocol (WAP) PUSH message containing a network initiated subsequent provisioning message. Furthermore, the WAP PUSH message may be received by the mobile terminal via a Short Message Service (SMS) message or over the current registered IP session. Alternatively, the NISP trigger message may be provided as an SMS text message.

In other embodiments of the present invention, a mobile terminal includes a transceiver configured to transmit and receive packet data over a wireless communications media and a network interface subsequent provisioning (NISP) processing circuit operably associated with the transceiver. The NISP processing circuit is configured to receive NISP requests from the transceiver and selectively initiate an IP session to respond to the received NISP requests based on a determination of whether the mobile terminal is executing a foreground data application utilizing a current registered IP session.

In some embodiments of the present invention, the NISP processing circuit is further configured to initiate an IP session to respond to a received NISP request utilizing a default network access identifier (NAI) profile to update the provisioning data of the mobile terminal if it is determined that the mobile terminal does not have a current registered IP session utilizing a custom NAI profile. The NISP processing circuit may also be configured to initiate an IP session to respond to a received NISP request utilizing a default network access identifier (NAI) profile to update the provisioning data of the mobile terminal if it is determined that the mobile terminal has a current registered IP session utilizing a custom NAI profile and does not have a foreground data application utilizing the current registered IP session. The NISP processing circuit may be further configured to terminate a current registered IP session and initiate an IP session utilizing a default NAI profile based on the determination of whether the mobile terminal is executing a foreground data application utilizing a current registered IP session.

In additional embodiments of the present invention, the mobile terminal further includes a queue configured to store NISP requests. In such embodiments, the NISP processing circuit is operably associated with the queue and is further configured to selectively store the NISP requests in the queue based on a determination of whether the mobile terminal is executing a foreground data application utilizing a current registered IP session. For example, the NISP processing circuit may be configured to store a request to initiate an IP session to update the provisioning data of the mobile terminal in the queue if it is determined that the mobile terminal is executing a foreground data application utilizing the current registered IP session when a NISP request is received.

The NISP processing circuit may also be configured to determine if an update to the provisioning data of the mobile terminal has completed successfully and remove a request corresponding to the update to the provisioning data from the queue if the update to the provisioning data completes successfully. The NISP processing circuit may be further configured to determine if an update to the provisioning data of the mobile terminal has failed, determine if the failure of the update to the provisioning data was a recoverable failure, remove a request corresponding to the update to the provisioning data from the queue if it is not a recoverable failure and retry the update of the provisioning if the failure of the update is a recoverable failure.

In additional embodiments of the present invention, the NISP processing circuit is configured to determine if the mobile terminal has terminated a current registered IP session, determine if a request to initiate an IP session to update the provisioning data of the mobile terminal is queued and initiate an IP session to update the provisioning data of the mobile terminal if it is determined that a request to initiate an IP session to update the provisioning data of the mobile terminal is queued and it is determined that the mobile terminal has terminated a registered IP session. The NISP processing circuit may also be configured to determine if all foreground data applications utilizing a registered IP session have terminated, determine if a request to initiate an IP session to update the provisioning data of the mobile terminal is queued and initiate an IP session to update the provisioning data of the mobile terminal if it is determined that a request to initiate an IP session to update the provisioning data of the mobile terminal is queued and it is determined that the mobile terminal has terminated all foreground data applications utilizing the registered IP session.

Additionally, the NISP processing circuit, may be configured to determine if the mobile terminal is initiating a re-registration of the current registered IP session, determine if a request to initiate an IP session to update the provisioning data of the mobile terminal is queued and initiate an IP session to update the provisioning data of the mobile terminal if it is determined that a request to initiate an IP session to update the provisioning data of the mobile terminal is queued and it is determined that the mobile terminal is initiating a re-registration of the current registered IP session.

The NISP processing circuit may also be configured to determine if a successfully completed update to the provisioning data interrupted a registered IP session and to re-initiate the interrupted registered IP session utilizing the updated provisioning data if the successfully completed update to the provisioning data interrupted a registered IP session.

In particular embodiment of the present invention, the mobile terminal is a radiotelephone.

As will be appreciated by those of skill in the art in light of the present disclosure, the present invention may be embodied as methods, systems and/or computer program products.

DETAILED DESCRIPTION

Figure 1:
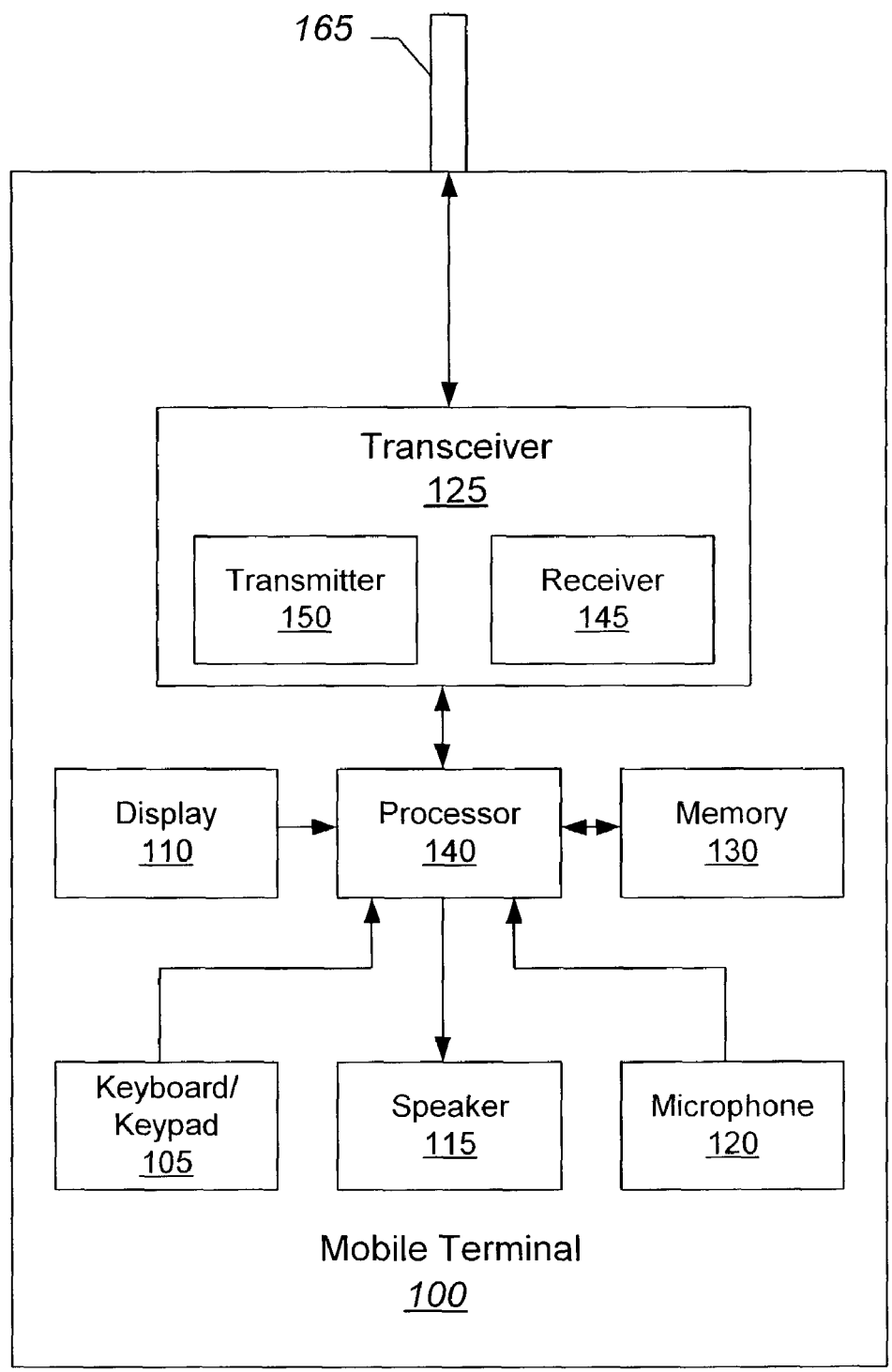
FIG. 1 is a schematic block diagram illustration of a mobile device according to embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as methods, systems, or computer program products. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, memory, non-volatile memory, a transmission media such as those supporting the Internet or an intranet, or magnetic storage devices.

Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package.

The present invention is described below with reference to flowchart illustrations and/or block and/or flow diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block and/or flow diagram block or blocks.

These computer program instructions may also be stored in a computer-readable memory that can direct a computer or other programmable processor to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processor to cause a series of operational steps to be performed on the computer or other programmable processor to produce a computer implemented process such that the instructions which execute on the computer or other programmable processor provide steps for implementing the functions or acts specified in the flowchart and/or block diagram block or blocks.

Embodiments of the present invention will now be further described with reference to the schematic block diagram illustration of a mobile terminal 100 in FIG. 1. FIG. 1 illustrates a mobile wireless terminal 100 that may comprise a keyboard/keypad 105, a display 110, a speaker 115, a microphone 120, a network transceiver 125, and a memory 130 that communicate with a processor 140. The network transceiver 125 typically includes a transmitter circuit 150 and a receiver circuit 145, which respectively transmit outgoing radio frequency signals to a base station and receive incoming radio frequency signals from the base station via an antenna 165. While a single antenna 165 is shown in FIG. 1, it is to be understood that multiple antennas and/or different types of antennas may be utilized based on the types of signals being received. The radio frequency signals transmitted between the mobile terminal 100 and a base station may comprise both traffic and control signals (e.g., paging signals/messages for incoming calls), which are used to establish and maintain communication with another party or destination, and may provide uplink and/or downlink communications. However, the present invention is not limited to such two-way communication systems.

The foregoing components of the mobile terminal 100 may be included in many conventional mobile terminals and their functionality is generally known to those skilled in the art. It should be further understood, that, as used herein, the term "mobile terminal" may include a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Although the present invention may be embodied in communication devices or systems, such as the mobile terminal 100, the present invention is not limited to such devices and/or systems. Instead, the present invention may be embodied in any method, transmitter, communication device, communication system, or computer program product that utilizes network initiated subsequent provisioning messages.

Figure 2:
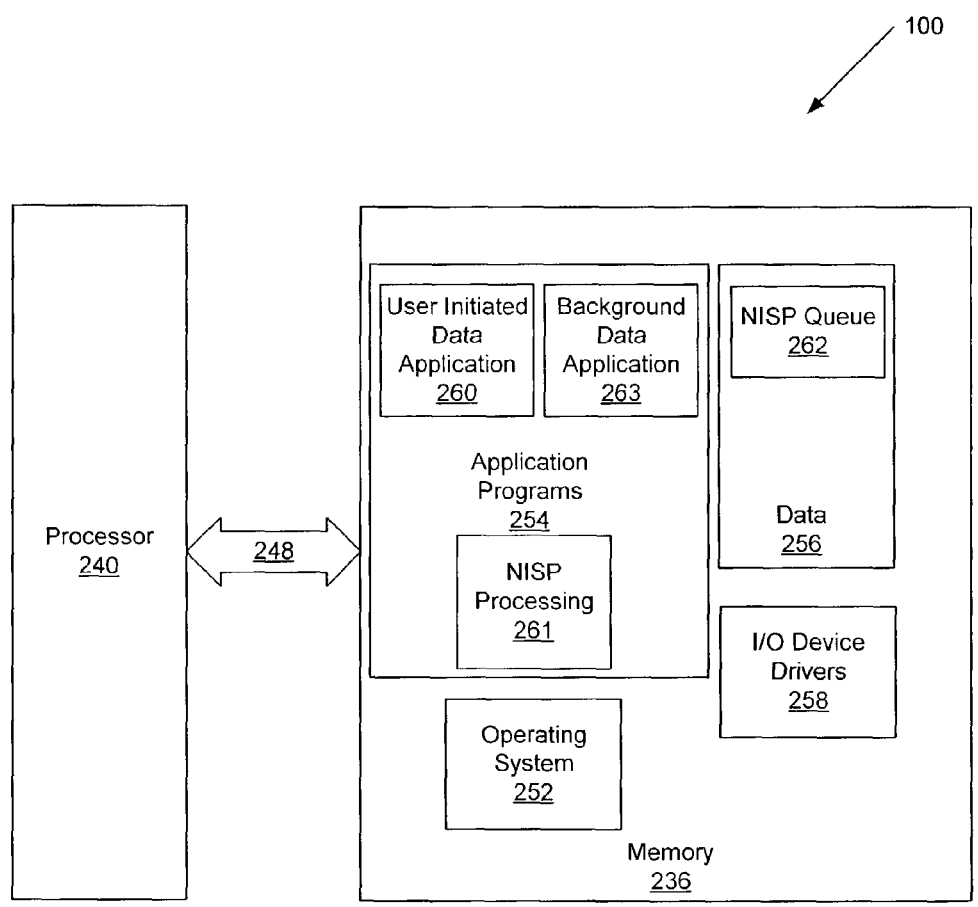
FIG. 2 is a detailed block diagram illustration of a mobile device according to embodiments of the present.

FIG. 2 is a block diagram of embodiments of a mobile terminal 100 that illustrates systems, methods, and computer program products in accordance with embodiments of the present invention. The processor 240 communicates with the memory 236 via an address/data bus 248. The processor 240 can be any commercially available or custom microprocessor including, for example, a digital signal processor. The memory 236 is representative of the overall hierarchy of memory devices containing the software and data used to implement the functionality of the mobile terminal 100. The memory 236 can include one or more of, but is not limited to, the following types of devices: cache, ROM, PROM, EPROM, EEPROM, flash memory, SRAM, and DRAM.

As shown in FIG. 2, the memory 236 may include several categories of software and/or data used in the mobile terminal 100: the operating system 252; the application programs 254; the input/output (I/O) device drivers 258; and the data 256. As will be appreciated by those of skill in the art, the operating system 252 may be any operating system suitable for use with a mobile terminal, such as OS/2, AIX or System390 from International Business Machines Corporation, Armonk, N.Y., WindowsCE, Windows95, Windows98, Windows2000, WindowsNT or WindowsXP from Microsoft Corporation, Redmond, Wash., Unix, Linux or Palm OS operating systems. The operating systems may be configured to support an IP-based or other such network communication protocol connection. The I/O device drivers 258 typically include software routines accessed through the operating system 252 by the application programs 254 to communicate with devices such as transceiver 125 and certain memory 236 components. The application programs 254 are illustrative of the programs that implement the various features of the mobile terminal 100 and preferably include at least one application that supports operations according to embodiments of the present invention. Finally, the data 256 represents the static and dynamic data used by the application programs 254, the operating system 252, the I/O device drivers 258, and other software programs that may reside in the memory 236.

As is further seen in FIG. 2, the application programs 254 may include a user initiated data application 260, a background data application 263 and a NISP processing module 261. The NISP processing module 261 may carry out the operations described herein for coordinating initiation of responses to NISP requests received by the mobile terminal 100. The user initiated data application 260 may be any application that utilizes a MIP session for communications. User initiated data applications are also referred to herein as "foreground applications." The data portion 256 of the memory 236, as shown in the embodiments of FIG. 2, may include a NISP queue 262 that stores, preferably in a non-volatile portion of the memory 236, NISP requests received by the mobile terminal 100 for subsequent processing.

While the present invention is illustrated, for example, with reference to the NISP processing module 261 being an application program in FIG. 2, as will be appreciated by those of skill in the art, other configurations may also be utilized while still benefiting from the teachings of the present invention. For example, the NISP processing module 261 may also be incorporated into the operating system 252, the I/O device drivers 258 or other such logical division of the mobile terminal 100. Thus, the present invention should not be construed as limited to the configuration of FIG. 2 but is intended to encompass any configuration capable of carrying out the operations described herein.

Figure 3:
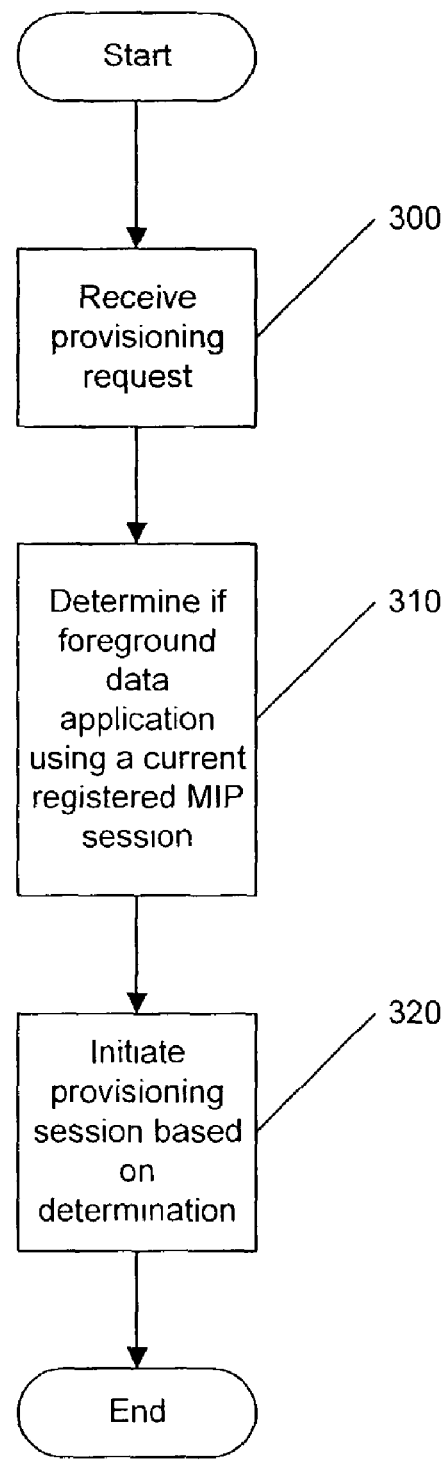
FIG. 3 is a flowchart illustrating operations according to embodiments of the present invention.

FIGS. 3 through 11 are flowchart illustrations of operations that may be carried out by a mobile terminal 100 according to embodiments of the present invention. Such operations may be carried out, for example, by the NISP processing module 261 of the mobile terminal 100. As seen in FIG. 3, a mobile terminal 100 receives a provisioning request from the network (block 300), for example, by receiving a Wireless Access Protocol (WAP) PUSH instruction containing a NISP Internet-Over-The-Air (IOTA) message. The mobile terminal 100 determines if a foreground data application, such as the user initiated data application 260, is utilizing a current registered MIP session (block 310). As described above, a foreground data application is an application that utilizes a MIP session and that is typically initiated by a user of the mobile terminal 100. Such foreground data applications may be contrasted with a background data application that may also utilize a MIP session but is typically not initiated by the user and the execution of which the user may be unaware. Thus, a foreground data application is an application the interruption of which may be intrusive to a user, whereas a background data application is an application the interruption of which may be non-intrusive to the user.

In any event, in response to the receipt of the provisioning request, the mobile terminal 100 initiates a provisioning session based on the determination of whether a foreground data application is executing and using a registered MIP session (block 320). Such a selective initiation of a MIP session to respond to the provisioning request may reduce the likelihood that the response to the provisioning request is intrusive to the user.

Figure 4:
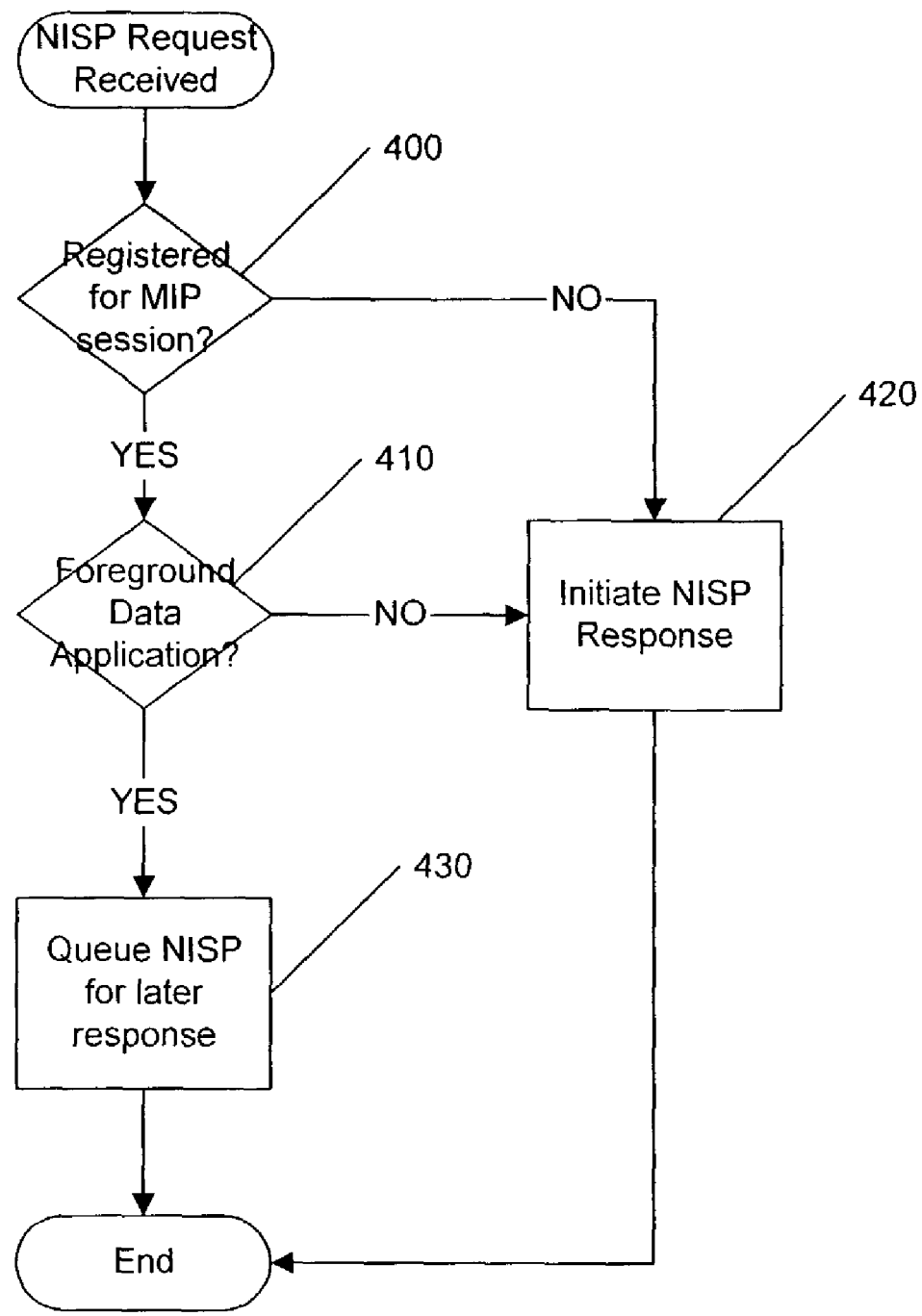
FIG. 4 is a flowchart illustrating operations when a NISP Internet-Over-The-Air (IOTA) request is received by a mobile device according to further embodiments of the present invention.

FIGS. 4 through 8 are flowcharts of operations of a mobile terminal 100 according to particular embodiments of the present invention for selectively initiating a MIP session to respond to a provisioning request, such as a NISP request. FIG. 4 illustrates operations of the mobile terminal 100 that may be carried out, for example, by the NISP processing module 261, when a NISP request, such as a WAP PUSH containing a NISP request, is received by the mobile terminal 100 for some embodiments of the present invention. As seen in FIG. 4, the mobile terminal 100 determines if a registered MIP session is established (block 400). Such a determination may be made, for example, by the NISP processing module 261 querying the operating system 252 for status, or, in embodiments where the NISP processing module is incorporated into the operating system 252, such a determination may be made by the operating system 252 directly evaluating the status of the mobile terminal 100. In particular embodiments of the present invention, the determination of whether a current registered MIP session exists also determines if the registered MIP session is a MIP session that registered with a custom NAI profile. In such embodiments, the determination of whether a registered MIP session is established is a determination of whether a registered MIP session is established using a custom NAI profile.

If a registered MIP session is not established (block 400), the mobile terminal 100 initiates the response to the NISP request (block 420). Responding to the NISP request may, for example, be carried out in a conventional manner by establishing a MIP session using the default NAI profile and sending a request for provisioning information to the network provisioning element using the established MIP session. In embodiments where the current MIP session is not a session established using a custom NAI profile (i.e. the current MIP session is a session established using the default NAI profile), the NISP response may be sent over the current MIP session.

If a registered custom NAI MIP session has been established (block 400), the mobile terminal determines if a foreground data application is executing that utilizes the registered MIP session (block 410). Such a determination may be made, for example, by the NISP processing module 261 querying the operating system 252 for status, or, in embodiments where the NISP processing module is incorporated into the operating system 252, such a determination may be made by the operating system 252 directly evaluating the status of the mobile terminal 100. If no foreground data application using the registered MIP session is executing (block 410), the NISP response is initiated as described above (block 420). However, in this case, initiation of the NISP response may also tear down the current registered MIP session that was registered using a custom NAI profile and establish a MIP session using the default NAI profile. Optionally, the torn down MIP session may be re-established after the new provisioning information is obtained and any executing applications resumed.

If a foreground data application using the registered MIP session is executing (block 410), the NISP request is queued (block 430). The NISP request may be queued, for example, by the NISP processing module 261 storing the WAP PUSH message in the NISP queue 262 which, in particular embodiments of the present invention, is in non-volatile memory. The queued WAP PUSH containing the NISP request may then be processed at a later time. Such subsequent processing of the NISP request according to particular embodiments of the present invention is illustrated in FIGS. 5 through 8.

Figure 5:
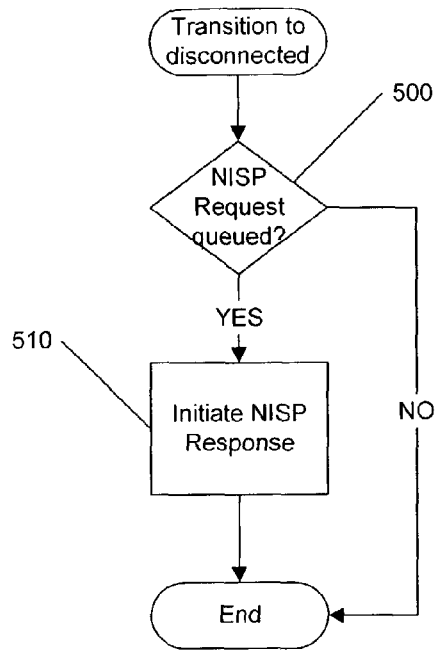
FIG. 5 is a flowchart illustrating operations when a mobile device transitions from a MIP registered state to a MIP de-registered state according to further embodiments of the present invention.

FIG. 5 illustrates operations of the mobile terminal 100 when a registered MIP session is terminated such that the mobile terminal 100 transitions from a connected state to a disconnected state for some embodiments of the present invention. As used herein, a connected state refers to an established MIP session and a disconnected state refers to a state where there is no established MIP session. For example, a mobile terminal may transition from a disconnected state to a connected state by initiation of a user initiated data application and/or the initiation of a background data application. The mobile terminal may transition from a connected stat to a disconnected state by, for example, expiration of a MIP registration (which may occur if there is no data activity within one MIP registration cycle).

As seen in FIG. 5, when the mobile terminal 100 transitions to the disconnected state, it is determined if a NISP request has been previously queued (block 500). Such a determination may be made, for example, by the NISP processing module 261 evaluating the contents of the NISP queue 252 to determine if a NISP request is stored in the NISP queue 252. If a NISP request is not queued (block 500), update operations are bypassed. If a NISP request is queued (block 500), the mobile terminal 100 initiates the NISP response (block 510). Operations for carrying out the NISP response may be the same as those described above with reference to block 420 of FIG. 4.

Figure 6:
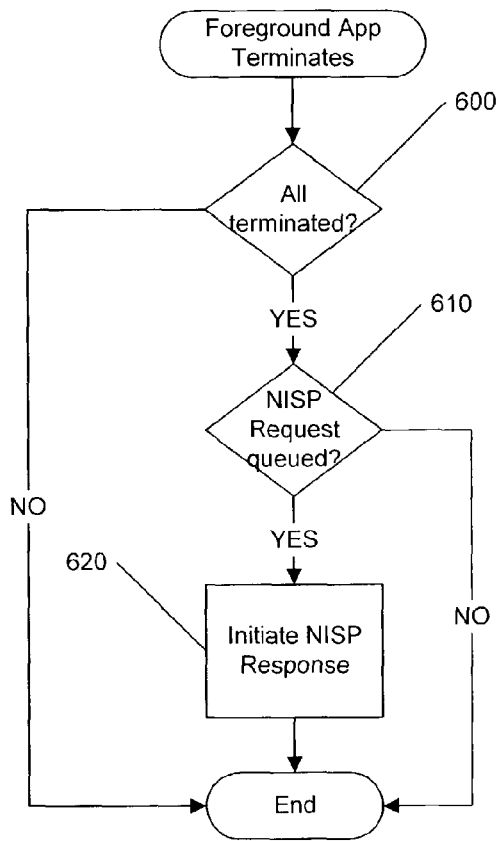
FIG. 6 is a flowchart illustrating operations when all active foreground data applications have terminated according to further embodiments of the present invention.

FIG. 6 illustrates operations of the mobile terminal 100 when a foreground application terminates for some embodiments of the present invention. As seen in FIG. 6, when the mobile terminal 100 terminates a foreground application, it is determined if all foreground application utilizing a registered MIP session have terminated (block 600). Such a determination may be made, for example, by the NISP processing module 261 querying the operating system 252 for status, or, in embodiments where the NISP processing module is incorporated into the operating system 252, such a determination may be made by the operating system 252 directly evaluating the status of the mobile terminal 100. If a foreground data application using the registered MIP session remains executing (block 600), then update operations are bypassed. If no foreground data application using the registered MIP session remains executing (block 600), the mobile terminal 100 determines if a NISP request has been queued (block 610). Such a determination may be made, for example, by the NISP processing module 261 evaluating the contents of the NISP queue 252 to determine if a NISP request is stored in the NISP queue 252. If a NISP request is not queued (block 610), operations continue in a conventional manner. If a NISP request is queued (block 610), the mobile terminal 100 initiates the NISP response (block 620). Operations for carrying out the NISP response may be the same as those described above with reference to block 420 of FIG. 4.

Figure 7:
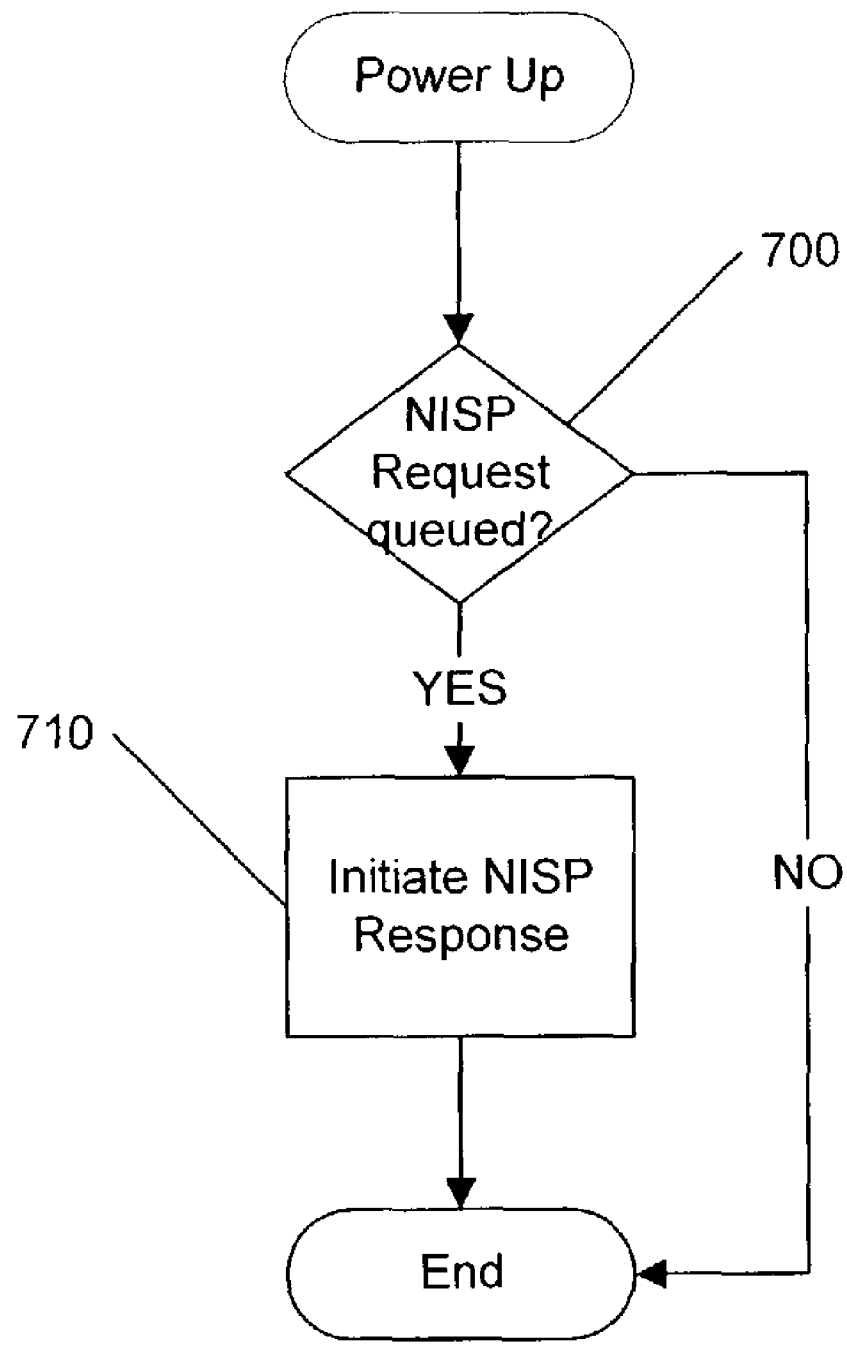
FIG. 7 is a flowchart illustrating operations upon power-up of the mobile device according to further embodiments of the present invention.

FIG. 7 illustrates operations of the mobile terminal 100 upon power-up for some embodiments of the present invention. As seen in FIG. 7, when the mobile terminal 100 powers up, it is determined if a NISP request has been previously queued (block 700). Such a determination may be made, for example, by the NISP processing module 261 evaluating the contents of the NISP queue 252 to determine if a NISP request is stored in the NISP queue 252. If a NISP request is not queued (block 700), update operations are bypassed. If a NISP request is queued (block 700), the mobile terminal 100 initiates the NISP response (block 710). Operations for carrying out the NISP response may be the same as those described above with reference to block 420 of FIG. 4.

Figure 8:
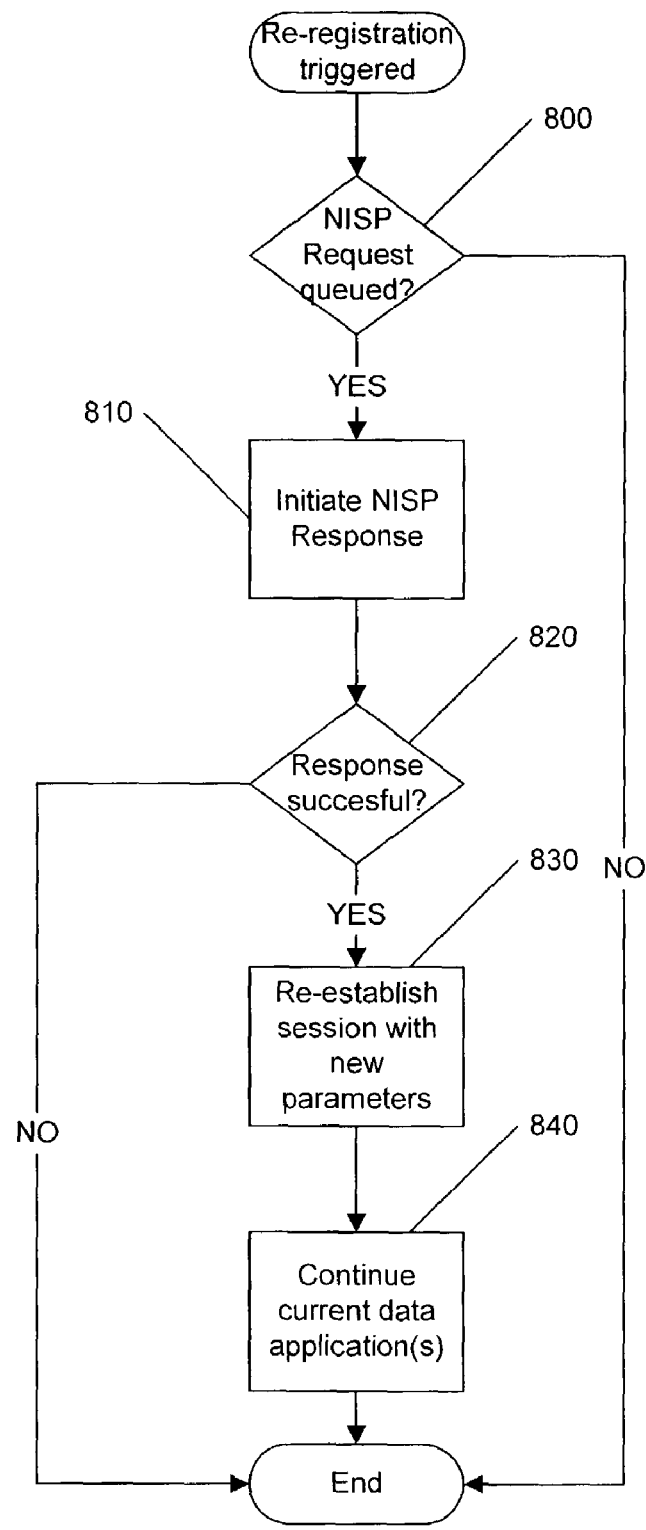
FIG. 8 is a flowchart illustrating operations when a mobile device re-registers a MIP session according to further embodiments of the present invention.

FIG. 8 illustrates operations of the mobile terminal 100 when the re-registration process of a current registered MIP session is triggered for some embodiments of the present invention. As described above, re-registration of a current registered MIP session typically occurs prior to expiration of the lease associated with the MIP session. As seen in FIG. 8, when the mobile terminal 100 triggers the re-registration process, it is determined if a NISP request has been previously queued (block 800). Such a determination may be made, for example, by the NISP processing module 261 evaluating the contents of the NISP queue 252 to determine if a NISP request is stored in the NISP queue 252. If a NISP request is not queued (block 800), update operations are bypassed. If a NISP request is queued (block 800), the mobile terminal 100 initiates the NISP response (block 810). Operations for carrying out the NISP response may be the same as those described above with reference to block 420 of FIG. 4. If the NISP response is successful (block 820), the session is re-established with the new parameters (block 830) and the existing data application(s) is continued (block 840). If the NISP response is not successful (block 820), then re-registration operations may continue. Alternatively, as described below with reference to FIG. 10, error handling operations may be carried out.

Figure 9:
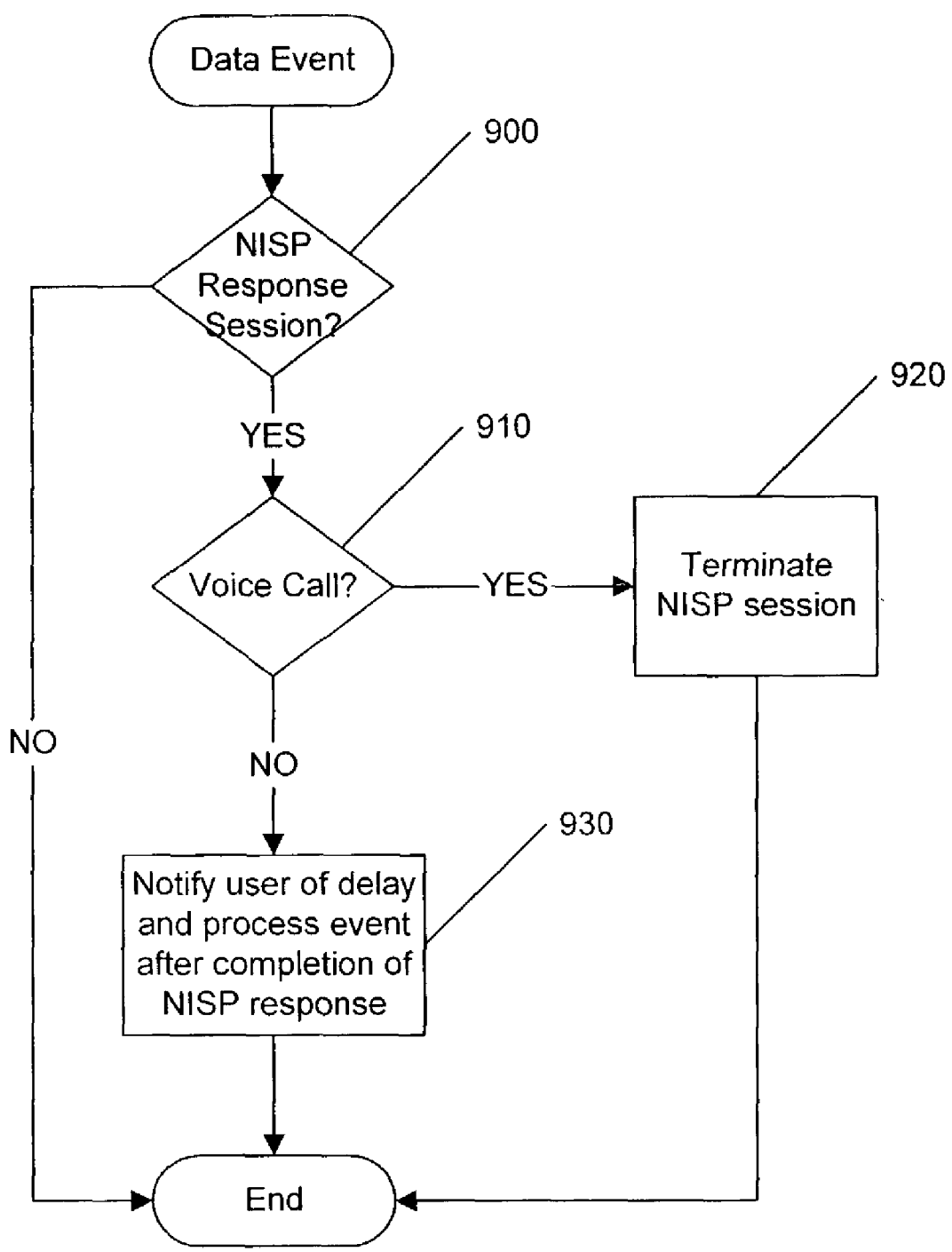
FIG. 9 is a flowchart illustrating operations when a user event causes transmission of data during a NISP response according to further embodiments of the present invention.

FIG. 9 illustrates operations of the mobile terminal 100 when a data event occurs for some embodiments of the present invention. A data event may include a user action that causes the transmission of data (e.g. causes a MIP session to be initiated) and/or incoming or outgoing voice calls. As seen in FIG. 9, when a data event occurs, the mobile terminal 100 determines if a MIP session has been established for a NISP response (block 900) (i.e. a NISP response is in progress). If a NISP response is not in progress (block 900), the mobile terminal 100 carries out conventional operations associated with the data event. If a NISP response is in progress (block 900), the mobile terminal 100 determines if the data event is a voice call (block 910) (either incoming or outgoing) and terminates the MIP session associated with the NISP response if it is a voice call (block 920). Such a termination may be considered a recoverable error as reflected in FIG. 10. If the data event is not a voice call (block 910), the mobile terminal 100 may notify the user that the requested data event will be delayed until the NISP response is completed and the data event processed after completion of the NISP response (block 930).

Figure 10:
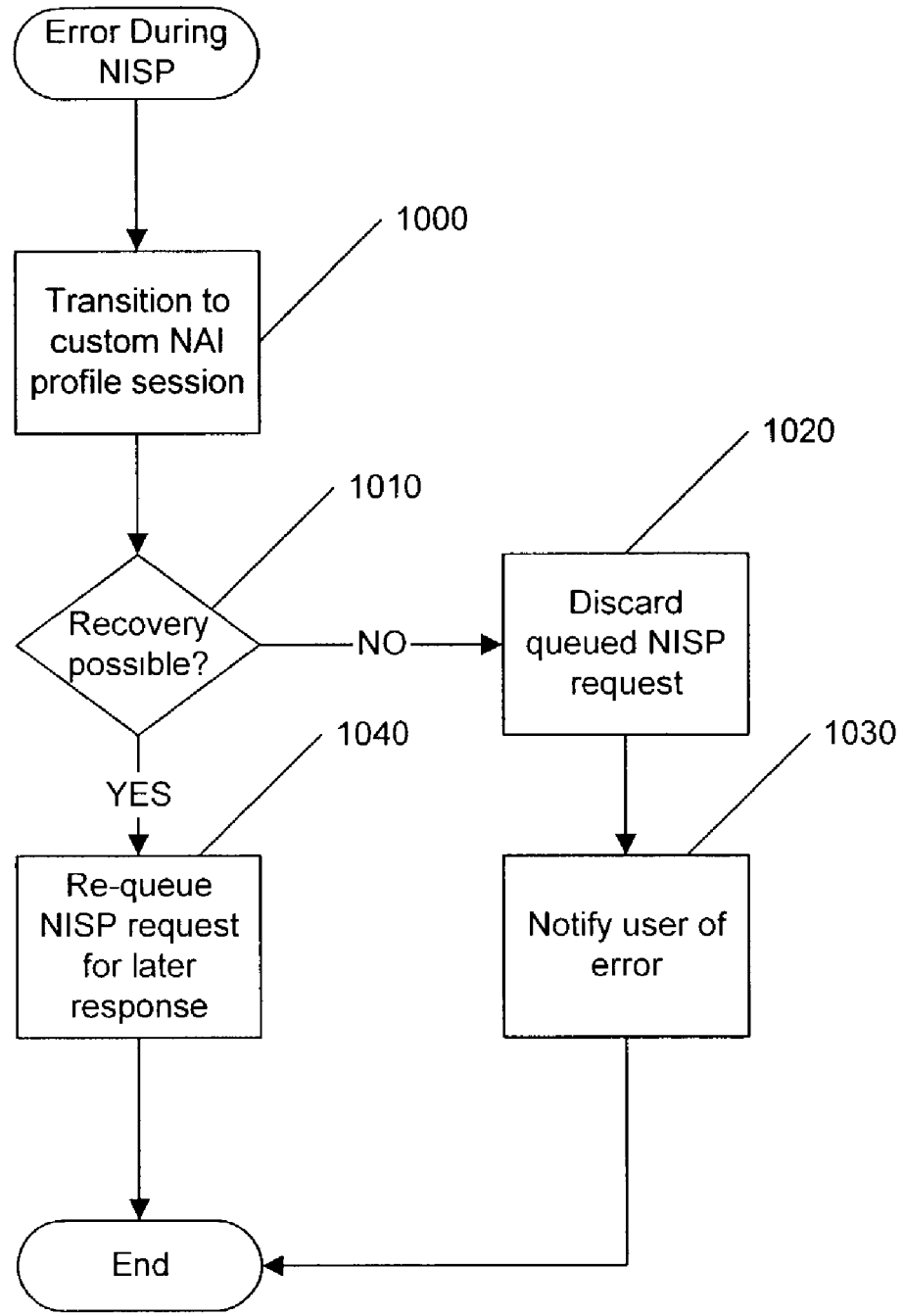
FIG. 10 is a flowchart illustrating operations when an error occurs during the NISP response according to further embodiments of the present invention.

FIG. 10 illustrates operations of the mobile terminal 100 according to particular embodiments of the present invention in the event that a NISP response terminates with an error. As seen in FIG. 10, if a NISP response terminates with an error, the mobile terminal 100 transitions to use of a custom NAI profile MIP session from use of the default NAI profile for provisioning (block 1000). The mobile terminal also determines if the error in the NISP response is a recoverable error (block 1010), for example, if the error was caused by interruption of the NISP response by a voice call as described above with reference to FIG. 9. If the error is not a recoverable error (block 1010), the NISP request is discarded (block 1020). The NISP request may be discarded by removing the NISP request from the NISP queue 262, for example, by deleting the WAP PUSH from the NISP queue 262. Optionally, the user may be notified of the error (block 1030), for example, by providing a display to the user indicating the occurrence of an error and, possibly, the nature of the error. If the error is a recoverable error (block 1010), the NISP request may be re-queued for later processing (block 1040). A delayed retry of the response to the NISP request may allow for recovery from a non-fatal error in the NISP response. Such a retry could be limited to a predefined number of retries where the NISP request is discarded if not successfully completed in the number of retries. The number of previous attempts to respond to the NISP request could be maintained in the NISP queue 262.

Figure 11:
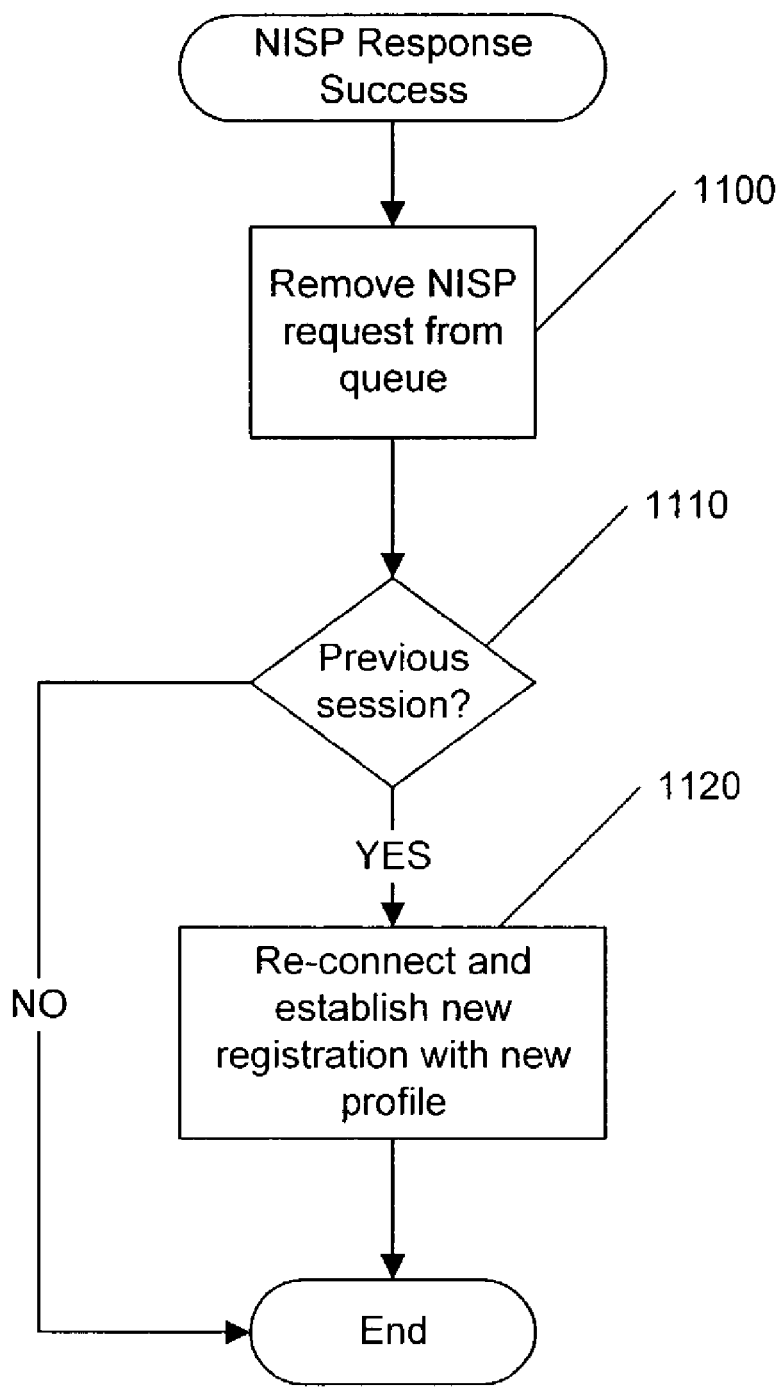
FIG. 11 is a flowchart illustrating operations upon successful completion of the NISP response according to further embodiments of the present invention.

FIG. 11 illustrates operations of the mobile terminal 100 according to particular embodiments of the present invention upon successful completion of a NISP response. As seen in FIG. 11, upon the successful completion of the response to the NISP request, the mobile terminal 100 removes the NISP request from the NISP queue 262 (block 1100). The NISP request may be removed from the NISP queue 262 by, for example, deleting the entry of the WAP PUSH in the NISP queue 262. The mobile terminal 100 may also determine if a session was established prior to processing the NISP request (block 1110). If not, a session is not re-established. However, if a session was established prior to processing the NISP request (block 1110), the mobile terminal 100 re-connects, which may involve prompting the user for a password, and establishes a new MIP registration utilizing the new profile information obtain in response to the NISP request (block 1120).

Embodiments of the present invention have been described above in general with reference to a NISP request. In particular embodiments of the present invention, the NISP request is provided as an Internet-Over-The-Air (IOTA) NISP message. However, embodiments of the present invention may be applicable to any configuration of mobile terminal where separate communications sessions having differing parameters are utilized to communicate with the mobile terminal, the mobile terminal does not support multiple concurrent sessions of different types and messages may be received while one type of session is established that necessitate use of a different type of session for a response.

The flowcharts, flow diagrams and block diagrams of FIGS. 1 through 11 illustrate the architecture, functionality, and operation of possible implementations of systems, methods and computer program products for processing of network initiated subsequent provisioning trigger requests according to embodiments of the present invention. In this regard, each block in the flow charts or block diagrams may represent a module, segment, or portion of code, which comprises one or more executable instructions for implementing the specified logical act(s). It should also be noted that, in some alternative implementations, the acts noted in the blocks may occur out of the order noted in the figures. For example, two blocks shown in succession may, in fact, be executed substantially concurrently, or the blocks may sometimes be executed in the reverse order, depending upon the functionality involved.

Furthermore, while the present invention has been described with reference to a network initiated subsequent provisioning in a wireless communication environment, embodiments of the present invention should not be construed as so limited but may be suitable for use in any environment where a network initiated subsequent provisioning request may be received at a time which results in delayed processing of the request.

Additionally, embodiments of the present invention are described with reference to a custom NAI profile. However, multiple custom NAI profiles may be utilized by a mobile terminal. The references to a custom profile may refer to single custom NAI profile or one of may custom NAI profiles.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of updating provisioning data of a mobile terminal, comprising:
    receiving a network initiated subsequent provisioning message requesting that the mobile terminal initiate a session to update the provisioning data of the mobile terminal;
    determining if the mobile terminal is executing a foreground data application utilizing a current registered Internet Protocol (IP) session; and
    selectively initiating an IP session to update the provisioning data of the mobile terminal based on the determination of whether the mobile terminal is executing a foreground data application utilizing a current registered IP session, wherein selectively initiating an IP session to update the provisioning data of the mobile terminal comprises queuing a request to initiate an IP session to update the provisioning data of the mobile terminal if it is determined that the mobile terminal is executing a foreground data application utilizing the current registered IP session, wherein the method further comprises:
    determining if the mobile terminal has terminated the current registered IP session; and
    wherein selectively initiating an IP session further comprises:
    determining if a request to initiate an IP session to update the provisioning data of the mobile terminal is queued if it is determined that the mobile terminal has terminated a registered IP session; and
    initiating an IP session to update the provisioning data of the mobile terminal if it is determined that a request to initiate an IP session to update the provisioning data of the mobile terminal is queued and it is determined that the mobile terminal has terminated a registered IP session.

2. The method of claim 1 wherein the mobile terminal establishes IP sessions utilizing one of a default profile and a custom profile and wherein determining if the mobile terminal is executing a foreground data application utilizing a current registered IP session comprises:
    determining if the mobile terminal has a current IP session utilizing the custom profile; and
    determining if a foreground data application is utilizing the current IP session if the mobile terminal has a current IP session utilizing the custom profile.

3. The method of claim 2, wherein selectively initiating an IP session to update the provisioning data of the mobile terminal comprises initiating an IP session utilizing the default profile to update the provisioning data of the mobile terminal if it is determined that the mobile terminal does not have a current registered IP session utilizing the custom profile.

4. The method of claim 2, wherein selectively initiating an IP session to update the provisioning data of the mobile terminal comprises initiating an IP session utilizing the default profile to update the provisioning data of the mobile terminal if it is determined that the mobile terminal has a current registered IP session utilizing the custom profile and does not have a foreground data application utilizing the current registered IP session.

5. The method of claim 4, wherein the step of initiating an IP session comprises:
    terminating the current registered IP session; and
    initiating an IP session utilizing the default profile.

6. The method of claim 1, further comprising:
    determining if an update to the provisioning data of the mobile terminal has completed successfully; and
    de-queuing a request corresponding to the update to the provisioning data if the update to the provisioning data has completed successfully.

7. The method of claim 1, further comprising:
    determining if an update to the provisioning data of the mobile terminal has failed;
    determining if the failure of the update to the provisioning data is a recoverable failure; and
    de-queuing a request corresponding to the update to the provisioning data if the failure is not a recoverable failure.

8. The method of claim 7, further comprising retrying the update to the provisioning data if the failure is a recoverable failure.

9. The method of claim 1, further comprising terminating an IP session to update the provisioning data of the mobile terminal if an incoming or outgoing voice call is initiated during the IP session to update the provisioning data.

10. The method of claim 1, wherein the current registered IP session is a mobile IP (MIP) session.

11. The method of claim 1, wherein receiving a network initiated subsequent provisioning message requesting that the mobile terminal initiate a session to update the provisioning data of the mobile terminal comprises receiving a Wireless Access Protocol (WAP) PUSH message containing a network initiated subsequent provisioning message.

12. The method of claim 11, wherein the WAP PUSH message is received by the mobile terminal via a Short Message Service (SMS) message.

13. The method of claim 11, wherein the WAP PUSH message is received by the mobile terminal over the current registered IP session.

14. The method of claim 1, wherein receiving a network initiated subsequent provisioning message requesting that the mobile terminal initiate a session to update the provisioning data of the mobile terminal comprises receiving a Short Message Service (SMS) text message, wherein the text message includes a network initiated subsequent provisioning trigger message.

15. A method of updating provisioning data of a mobile terminal, comprising:
receiving a network initiated subsequent provisioning message requesting that the mobile terminal initiate a session to update the provisioning data of the mobile terminal;
determining if the mobile terminal is executing a foreground data application utilizing a current registered Internet Protocol (IP) session; and
selectively initiating an IP session to update the provisioning data of the mobile terminal based on the determination of whether the mobile terminal is executing a foreground data application utilizing a current registered IP session, wherein selectively initiating an IP session to update the provisioning data of the mobile terminal comprises queuing a request to initiate an IP session to update the provisioning data of the mobile terminal if it is determined that the mobile terminal is executing a foreground data application utilizing the current registered IP session, wherein the method further comprises:
determining if all foreground data applications utilizing the registered IP session have terminated; and
wherein selectively initiating an IP session further comprises:
determining if a request to initiate an IP session to update the provisioning data of the mobile terminal is queued if it is determined that the mobile terminal has terminated all foreground data applications utilizing the registered IP session; and
initiating an IP session to update the provisioning data of the mobile terminal if it is determined that a request to initiate an IP session to update the provisioning data of the mobile terminal is queued and it is determined that the mobile terminal has terminated all foreground data applications utilizing the registered IP session.

16. A method of updating provisioning data of a mobile terminal, comprising:
receiving a network initiated subsequent provisioning message requesting that the mobile terminal initiate a session to update the provisioning data of the mobile terminal;
determining if the mobile terminal is executing a foreground data application utilizing a current registered Internet Protocol (IP) session; and
selectively initiating an IP session to update the provisioning data of the mobile terminal based on the determination of whether the mobile terminal is executing a foreground data application utilizing a current registered IP session, wherein selectively initiating an IP session to update the provisioning data of the mobile terminal comprises queuing a request to initiate an IP session to update the provisioning data of the mobile terminal if it is determined that the mobile terminal is executing a foreground data application utilizing the current registered IP session, wherein the method further comprises:
determining if the mobile terminal is initiating a re-registration of the current registered IP session; and
wherein selectively initiating an IP session further comprises:
determining if a request to initiate an IP session to update the provisioning data of the mobile terminal is queued if the mobile terminal is initiating a re-registration of the current registered IP session; and
initiating an IP session to update the provisioning data of the mobile terminal if it is determined that a request to initiate an IP session to update the provisioning data of the mobile terminal is queued and it is determined that the mobile terminal is initiating a re-registration of the current registered IP session.

17. A method of updating provisioning data of a mobile terminal, comprising:
receiving a network initiated subsequent provisioning message requesting that the mobile terminal initiate a session to update the provisioning data of the mobile terminal;
determining if the mobile terminal is executing a foreground data application utilizing a current registered Internet Protocol (IP) session; and
selectively initiating an IP session to update the provisioning data of the mobile terminal based on the determination of whether the mobile terminal is executing a foreground data application utilizing a current registered IP session, wherein selectively initiating an IP session to update the provisioning data of the mobile terminal comprises queuing a request to initiate an IP session to update the provisioning data of the mobile terminal if it is determined that the mobile terminal is executing a foreground data application utilizing the current registered IP session, wherein the method further comprises:
determining if an update to the provisioning data of the mobile terminal has completed successfully;
de-queuing a request corresponding to the update to the provisioning data if the update to the provisioning data completes successfully;
determining if the successfully completed update to the provisioning data interrupted a registered IP session; and
re-initiating the interrupted registered IP session utilizing the updated provisioning data if the successfully completed update to the provisioning data interrupted a registered IP session.

18. A mobile terminal comprising:
a transceiver configured to transmit and receive packet data over a communications media;
a network interface subsequent provisioning (NISP) processing circuit operably associated with the transceiver and configured to receive NISP requests from the transceiver and selectively initiate an IP session to respond to the received NISP requests based on a determination of whether the mobile terminal is executing a foreground data application utilizing a current registered IP session, and:
a queue configured to store NISP requests;
wherein the NISP processing circuit is operably associated with the queue and is further configured to selectively store received NISP requests in the queue based on a determination of whether the mobile terminal is executing a foreground data application utilizing a current registered IP session;
wherein the NISP processing circuit is further configured to queuing a NISP request if it is determined that the mobile terminal is executing a foreground data application utilizing the current registered IP session when a NISP request is received, and wherein the NSP processing circuit is further configured to include any one or a combination of the following:
to determine if the mobile terminal has terminated a current registered IP session, determine if a NISP request is queued and initiate an IP session to update the provisioning data of the mobile terminal if it is determined that a NISP request is queued and it is determined that the mobile terminal has terminated a registered IP session;

to determine if all foreground data applications utilizing a registered IP session have terminated, determine if a NISP request is queued and initiate an IP session to update the provisioning data of the mobile terminal if it is determined that a NISP request is queued and it is determined that the mobile terminal has terminated all foreground data applications utilizing the registered IP session;

to determine if the mobile terminal is initiating a re-registration of the current registered IP session, determine if a NISP request is queued and initiate an IP session to update the provisioning data of the mobile terminal if it is determined that a NISP request is queued and it is determined that the mobile terminal is initiating a re-registration of the current registered IP session; and to determine if an update to the provisioning data of the mobile terminal has completed successfully and remove a NISP request corresponding to the update to the provisioning data from the queue if the update to the provisioning data completes successfully and to determine if the successfully completed update to the provisioning data interrupted a registered IP session and re-initiate the interrupted registered IP session utilizing the updated provisioning data if the successfully completed update to the provisioning data interrupted a registered IP session.

19. The mobile terminal of claim 18, wherein the NISP processing circuit is further configured to initiate an IP session to respond to a received NISP request utilizing a default network access identifier (NAI) profile to update the provisioning data of the mobile terminal if it is determined that the mobile terminal does not have a current registered IP session utilizing a custom NAI profile.

20. The mobile terminal of claim 18 wherein the NISP processing circuit is further configured to initiate an IP session to respond to a received NISP request utilizing a default network access identifier (NAI) profile to update the provisioning data of the mobile terminal if it is determined that the mobile terminal has a current registered IP session utilizing a custom NAI profile and does not have a foreground data application utilizing the current registered IP session.

21. The mobile terminal of claim 18, wherein the NISP processing circuit is further configured to terminate a current registered IP session and initiate an IP session utilizing a default profile based on the determination of whether the mobile terminal is executing a foreground data application utilizing a current registered IP session.

22. The mobile terminal of claim 18, wherein the NISP processing circuit is further configured to determine if an update to the provisioning data of the mobile terminal has failed, determine if the failure of the update to the provisioning data was a recoverable failure and remove a NISP request corresponding to the update to the provisioning data from the queue if the failure is not a recoverable failure.

23. The mobile terminal of claim 22, wherein the NISP processing circuit is further configured to retry the update of the provisioning if the failure of the update is a recoverable failure.

24. The mobile terminal of claim 18, wherein the NISP processing circuit is further configured to determine if the mobile terminal has terminated a current registered IP session, determine if a NISP request is queued and initiate an IP session to update the provisioning data of the mobile terminal if it is determined that a NISP request is queued and it is determined that the mobile terminal has terminated a registered IP session.

25. The mobile terminal of claim 18, wherein the NISP processing circuit is further configured to determine if all foreground data applications utilizing a registered IP session have terminated, determine if a NISP request is queued and initiate an IP session to update the provisioning data of the mobile terminal if it is determined that a NISP request is queued and it is determined that the mobile terminal has terminated all foreground data applications utilizing the registered IP session.

26. The mobile terminal of claim 18, wherein the NISP processing circuit is further configured to determine if the mobile terminal is initiating a re-registration of the current registered IP session, determine if a NISP request is queued and initiate an IP session to update the provisioning data of the mobile terminal if it is determined that a NISP request is queued and it is determined that the mobile terminal is initiating a re-registration of the current registered IP session.

27. The mobile terminal of claim 18, wherein the NISP processing circuit is further configured to determine if an update to the provisioning data of the mobile terminal has completed successfully and remove a NISP request corresponding to the update to the provisioning data from the queue if the update to the provisioning data completes successfully and wherein the NISP processing circuit is further configured to determine if the successfully completed update to the provisioning data interrupted a registered IP session and re-initiate the interrupted registered IP session utilizing the updated provisioning data if the successfully completed update to the provisioning data interrupted a registered IP session.

28. The mobile terminal of claim 18, wherein the initiated IP session and the current registered IP session comprise mobile IP (MIP) sessions.

29. The mobile terminal of claim 18, wherein the mobile terminal comprises a radiotelephone.

30. The mobile terminal of claim 18, wherein the communications media comprises a wireless communications media.

* * * * *